United States Patent [19]

Lerch

[11] Patent Number: 4,543,829

[45] Date of Patent: Oct. 1, 1985

[54] ULTRASONIC IMAGING SYSTEM

[75] Inventor: Reinhard Lerch, Erlangen, Fed. Rep. of Germany

[73] Assignee: Siemens AG, Berlin & Munich, Fed. Rep. of Germany

[21] Appl. No.: 572,728

[22] Filed: Jan. 20, 1984

[30] Foreign Application Priority Data

Jan. 21, 1983 [DE] Fed. Rep. of Germany ....... 3301967

[51] Int. Cl.[4] ............................................. G01N 29/00
[52] U.S. Cl. ..................................................... 73/626
[58] Field of Search .......................... 73/626, 625, 620; 367/103, 105; 128/660

[56] References Cited

U.S. PATENT DOCUMENTS

| 4,223,560 | 9/1980 | Glenn ..................................... | 73/626 |
| 4,241,608 | 12/1980 | Dees et al. ............................ | 73/626 |
| 4,417,475 | 11/1983 | Okazaki ................................. | 73/626 |
| 4,484,477 | 11/1984 | Buxton ................................... | 73/626 |

OTHER PUBLICATIONS

W. Gebhard—"Grundlagen, Technik und Anwendung in der Werkstoffpruefung", IzfP—Bericht Nr. 770117-TW, pp. 60 through 65, Saarbruecken 1977.

*Primary Examiner*—Stephen A. Kreitman
*Attorney, Agent, or Firm*—Thomas H. Jackson

[57] ABSTRACT

Ultrasonic imaging system with a linear array having several transducer elements of which a respective group of commonly controlled transducer elements forms one beam aperture and to which one transmitting system and one receiving system is allocated. A delay time is digitally set for each transducer element of the beam aperture and triggered by means of a starting pulse, and the echo signals of the transducer elements of the beam aperture are added and phase delayed by the software. In this manner, an ultrasonic imaging system for high ultrasonic frequencies, particularly at least in the order of 30 MHz is achieved in which transmitting and receiving lens can be created independently of one another in the computer by changing the software, while the hardware remains unchanged.

7 Claims, 2 Drawing Figures

ULTRASONIC IMAGING SYSTEM

BACKGROUND OF THE INVENTION

This invention relates to an ultrasonic imaging system with a linear array consisting of several transducer elements which are divided into groups. Each group of commonly controlled transducer elements forms one beam aperture to which one transmitting system and one receiving system is allocated. Each group is equipped with electronic focusing through phase delay for its sound field and with a parallel scanning of the sound field by electronic advancement.

During non-destructive material testing with ultrasound, focusing modulators are more often used for determining the extent of imperfections because of the improved resolution they provide. However, the modulators require different test probes with appropriate focal distances at different depths of imperfection investigation. Thus substantial savings of testing time and costs can be achieved with the introduction of an array test probe because it permits electronic focusing at different depths of the material.

Systems employing the technique of horizontal rows of transmitters can be roughly divided into three groups, i.e. image converters, actual or real-time scanners and phase-modulated arrays of transmitters or phased arrays.

Image converters are systems in which the image of an object penetrated by sound is pictured on a linear or planar array by means of acoustic lens. The stationary distribution of sound pressure across the plane of the array is scanned by cycling through one element after the other. Since the resolution and the field of view depend on the size and number of the elements, the number of individual elements for image converters becomes relatively large, typical several thousands. The acoustic lens/image converter system, in other words, registers the stationary distribution of the sound pressure in an object plane that is parallel to the array side.

The real-time scanner, on the other hand, operates in the pulse/echo mode. The test probe is a linear array, whose elements are activated one after the other, individually or in groups. From the magnitude of the echo and from the delay time, a B-image is created on an intensity-modulated oscilloscope. The width of the image is determined by the length of the array.

Phased-arrays and their test probe, in contrast to the real-time scanner, generally have a smaller number of elements and all of the individual modulators contribute to the formation and control of the sound field. Because of the sweeping movement of the beam, a relatively large, sector-shaped B-image is obtained with this technique in spite of the shortness of the test probe.

An ultrasonic imaging system for examination of pressurized reactor containers is known as a phase-modulated pulse-echo system which, in addition to A-, B- and C-scans provides the possibility of halographic examinations. The entire system is controlled by a PDP 11/34 computer. The pulse-echo operation is used for rapid error search and localization. The acoustic halography then provides more accurate information concerning areas that are suspect of imperfections. The test probe contains a linear array of 120 transmitting and receiving elements which are arranged in two adjacent rows. The system operates at an ultrasonic frequency of 2.3 MHz and the element spacing is $\lambda/2$ for density waves and $\lambda$ for shear waves. Every element has its own pulse generator. A transmitting and a receiving system is allocated to these transmitting and receiving elements. For pulse-echo operation, 16 of the 120 elements are always combined during the transmitting phase; during the receiving phase, only 8 elements of this group are operating. During the transmitting phase, the beam aperture consists of 16 elements which are connected to the 120 elements by means of a switching matrix. The receive signals are routed via a switching matrix, pre-amplified, converted from analog to digital signals, appropriately delayed by means of a shift register and reconverted to analog signals. The testing speed of welding seams is up to ½ square meter/min (W. Gebhard:—"Grundlagen, Technik und Anwendung in der Werkstoffpruefung", IzfP—Bericht Nr. 770117-TW, pages 60 through 65, Saarbruecken 1977).

In this well-known ultrasonic imaging system, the selection of the array is implemented by means of a switching matrix. However, it does not seem possible to create a switching matrix consisting of several thousands switching matrix points, and which still functions well at high ultrasonic frequencies.

SUMMARY OF THE INVENTION

It is an object of the invention to provide an ultrasonic imaging system for high ultrasonic frequencies, specifically at least approximately 30 MHz, in which the use of a switching matrix in the transmitting receiving system is avoided. Additionally, the ultrasonic imaging system should facilitate the presentation of an ultrasonic C-image of finely-structured objects at this ultrasonic frequency.

It is a further object of the invention to provide an ultrasonic imaging system which is suitable for use in the field of medicine, preferably for the diagnosis of skin diseases (dermatosis) and specifically for diagnosis during open heart surgery.

It is a further object of the invention that the system be suitable for use in non-destructive material testing, primarily in the fault localization of thin, soldered and bonded layers, specifically for determining the thickness of the layers in multilayer systems.

The foregoing objects and others are achieved by the invention having the characteristic features of claim 1. An ultrasonic imaging system for high ultrasonic frequencies, specifically of at least 30 MHz, can be created while keeping the hardware costs for the receiving system low, by digitally setting a delay time for every transducer element of the beam aperture and triggering it by means of a starting pulse. This is realized by adding the echo signals of the transducer elements of the beam aperture in the computer with phase delay. In this ultrasonic imaging system operating in the pulse-echo mode, which, e.g., consists of several, preferably several hundreds, of linearily arranged transducer elements, the selection is phase-delayed for the purpose of focusing. In other words, an ultrasonic lens is created by electronic means. The beam aperture, which consists, e.g., of several, preferably approximately 15 and specifically, approximately 30, linearily arranged transducer elements, is advanced electronically. For instance, by using group advancement, preferably by using the half-cycle method and specifically, by using a modified half-cycle method the electronic advancing is achieved.

By implementing these features the functions of several individual test probes used in the design can be combined into a single test probe, in which transmitting lens and receiving lens can be created independently of one another in a computer by changing the software, while the hardware remains unchanged. The digital design of the receiving system has the additional advantage that the focusing depth can be easily changed, even during the scanning process, so that an image of curved surfaces can also be obtained. Furthermore, bonding problems in soldered and bonded layers between heat sinks and IC housings can be investigated with this ultrasonic imaging system. It has a high resolution, for example a lateral resolution of approximately 150 micrometers. In addition to these applications in material testing, the ultrasonic imaging system can be used in the field of medicine, for instance, for the diagnosis of the degeneration of the optic nerve in case of glaucoma, in which case an ultrasonic frequency setting of approximately 15 MHz is used. Further applications in the field of skin diagnosis, and for heart and kidney diagnosis on a patient for localizing a stenosis or a kidney stone are contemplated. For this purpose, a higher ultrasonic frequency is practical, preferably at least 30 MHz. In addition to the C-image, the device also provides the ultrasonic B-image normally used in medicine.

Other features and advantages of the invention will be apparent from the following description of the preferred embodiments, and from the claims.

For a full understanding of the present invention, reference should now be made to the following detailed description of the preferred embodiments of the invention and to the accompanying drawings.

DETAILED DESCRIPTION

Preferred embodiments of the invention will now be described with reference to the Figs.

Figure 1:
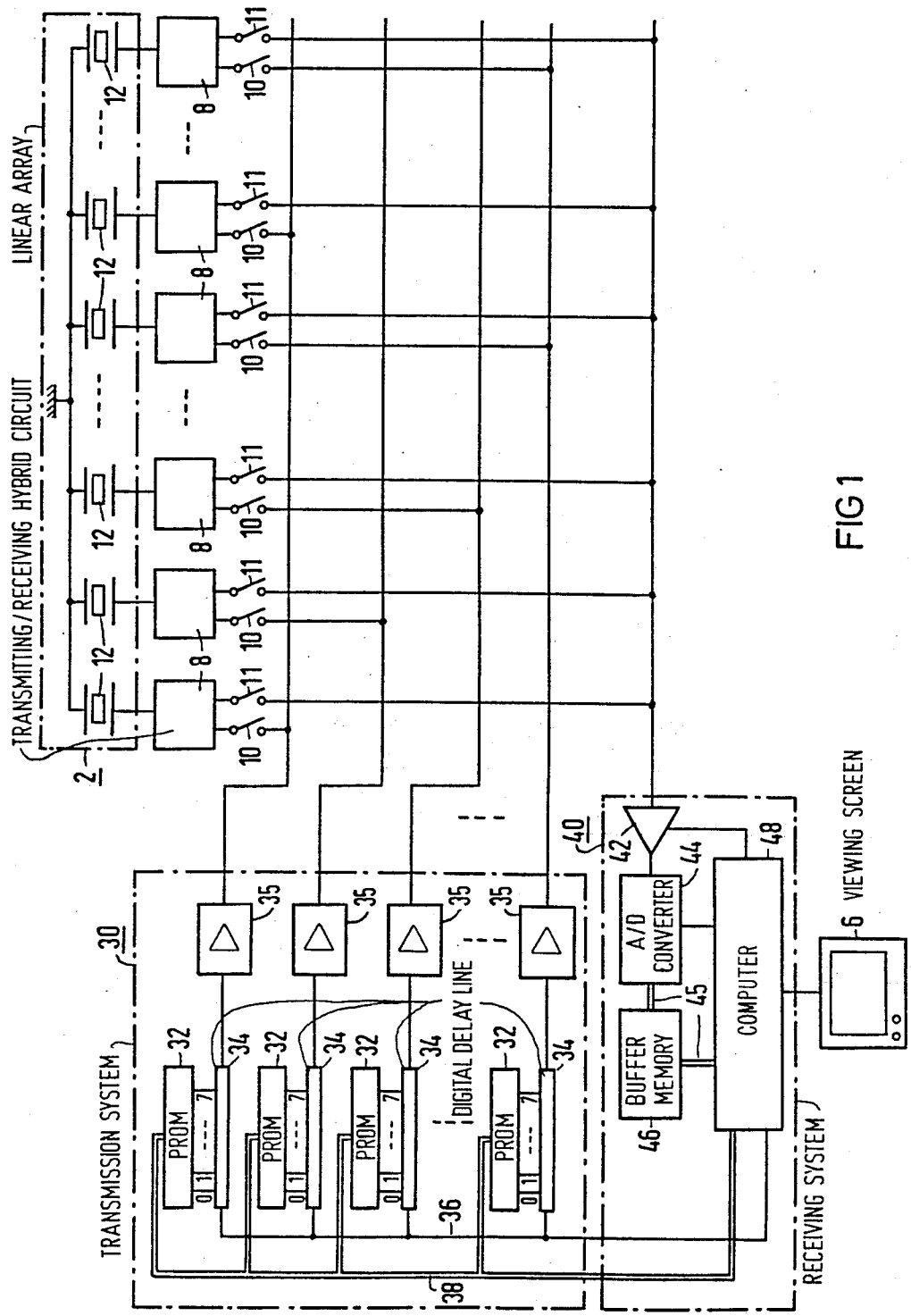
FIG. 1 shows a block diagram of the ultrasonic imaging system.

In FIG. 1, a block diagram of the ultrasonic imaging system is shown, which consists of a linear array 2, a transmission system 30, a receiving system 40, a viewing screen 6, and of several, typically 300, transmitting and receiving hybrid circuits 8. A transmit switch 10 and a receiver switch 11 are also allocated to each of the transmitting and receiving hybrid circuits 8. The linear array contains several, preferably 300 transducer elements 12, which, for instance, may consist of lead-metaniobate $Pb(NO_3)$, preferably lead-circonate-titanate PZT. The ultrasonic frequency of these transducer elements 12 is preferably at least 30 MHz. In this ultrasonic imaging system operating in the pulse-echo mode, only one group each of n (preferably 15 and specifically 30) transducer elements 12 is active at the same time. These n active transducer elements 12 make up the beam aperture, which, for instance, is electronically advanced by means of the group advancement, preferably by using the half-cycle method and specifically by using the modified half-cycle method. The selection for the purpose of focusing takes place through phase-delaying. The grid size of the linear array 2, e.g., consisting of 300 transducer elements 12, is typically 150 micrometers whereby the actual modulation width, which is equal to the grid size minus the width of the cross-section, is approximately 100 micrometers. The entire length of the array 2 measures, therefore, only 45 mm. The length of the modulations for instance, is 5.5 mm, while their thickness is a function of the resonance requirement. For lead-metaniobate $Pb(NO_3)$, the thickness of the transducer elements, for instance, is approximately 55 micrometers, and for lead-circonate-titanate PZT the thickness is approximately 67 micrometers.

The transmitting system consists of several buffers 32, several digitally programmable delay lines 34 and several transmitting amplifiers 35. A buffer 32, one digital programmable delay line 34 and one transmitting amplifier 35 are allocated to each of the n active transducer elements 12 of the beam aperture if the electronic advancement of the sound field takes place according to the group advancement. The beam aperture, for instance, is made up of 30 transducer elements.

If the electronic advancement of the sound field is implemented by the half-cycle method or the modified half-cycle method, the transmitting system 30 is expanded by one channel, i.e., by one buffer 32, one digitally programmable delay line 34, and by one transmitting amplifier 35. Thus the beam aperture consists of alternately n or n+1 active transducer elements 12. The selection of the transmitting amplifiers 35 takes place via square wave pulses which are supplied by a clock pulse generator of a computer 48 by means of a transmitter trigger line 36. These square wave pulses are delayed by means of the programmable delay line 34. The delay times are stored each time in the buffers 32 in digital form. In each of these buffers 32, the delay times, which are determined by means of the computer 48 and output via a data bus 38, are temporarily stored in buffers.

The receiving system 40 consists of one broadband amplifier 42, one analog-digitial converter 44, one buffer memory 46, and one computer. In certain cases it may be advantageous that the receiving system 40 is equipped, for instance, with n broadband amplifiers 42, with n 8-bit analog digital converters 44, and with n buffer memories 46. In each case the buffer memory 46 is connected with the 8-bit analog-digital converter 44 and the computer 48 by means of a data bus 45.

During receiving, the computer 48, after a lag time, starts the analog-digital conversion of the echo signal that is supplied by the first transducer element 12 to the active lens. After acceptance of the digitized echo signal in the computer memory, the transmitting system 30 supplies a new transmit pulse to an object from the same location of the lens. This time the echo signal of the second transducer element 12 is recorded digitally. After all transducer elements 12 of the active lens have been scanned accordingly, the computer is in a position to add the digital signals with phase delay, in order to form a synthetic receive focus in this manner. Since the signals have to be added in the proper phase, the $\lambda/8$ criterion must be observed during the scanning. In other words, an analog-digital converter 44 with a conversion rate of, for example, 200 MHz with an 8-bit resolution is required if it is desired to realize an ultrasonic frequency of, for instance 25 MHz. In addition, a fast buffer memory 46, with the same pulse rate of 200 MHz, is required because the digital scanning values are read from the analog-digital converter 44 at a pulse rate of 200 MHz and are read into the buffer memory 46 at this pulse rate. It is the function of the buffer memory 46 to adapt the fast analog-digital converter 44 to the computer 48, which operates at a far lower frequency. If ultrasonic waves are received which are above 25 MHz, the transmitting lens position is maintained, due to the reproducibility of the echo signals, and the echo signal, offset in time, is scanned in two or more successive cycles, so as to apparently achieve the maximum scanning rate by means of n views from the same position.

In the case of n scans of an echo signal, offset in time, the number of shots required to scan an array line is $a \cdot m \cdot n \cdot (z-n)$ where a = process coefficient
m = number of shots
n = number of the transducer elements of the beam aperture
z = number of the transducer element of the array.

If, however, n analog-digital converters 44 and, accordingly, n buffer memories 46 and n broadband amplifiers 42 are provided, the time loss factor $m \times n$ is reduced to m. Generally, two shots are sufficient.

Figure 2:
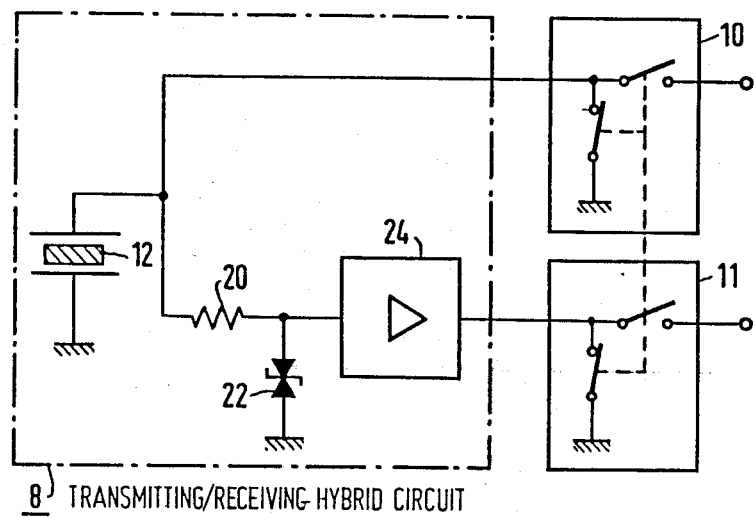
FIG. 2 illustrates an advantageous transmitting and receiving hybrid circuit.

FIG. 2 shows an advantageous transmitting and receiving hybrid circuit 8 with a transmit switch 10 and a receiver switch 11. The purpose of this transmitting and receiving hybrid circuit 8 is to separate the respective transmission and receiving signals of the transducer element 12. During transmission, the transmit switch 10 is directly coupled to the transducer element 12; during receiving, a resistor 20, a so-called bi-directional transients absorption Zener diode 22 and a reception amplifier 24 are connected between the receiver switch 11 and the transducer element 12. The bidirectional transients absorption Zener diode 22 with low threshold voltage serves as protection for the receiver input. The resistor 20 determines the amount of current flowing through the bidirectional transients absorption Zener diode 22. Since this transmitting and receiving hybrid circuit 8 does not form a closed circuit, the tendency to oscillate is avoided. These switches 10 and 11 are each implemented as double-pole switches because of the stop-band attenuation that can be achieved in this manner. The switching clicks of radiator switch 10 are practically eliminated if PIN diodes are used as switches 10. During receiving, a CMOS switch is used as receiver switch 11 because of the ease of activation with a TTL level and the high stop-band attenuation.

The greater advantage of the purely digital design of this device lies in its flexibility, because transmitting and receiving lens can be formatted independently of each other by the software in the computer, while the hardware remain unchanged. The size of the beam aperture has an effect only on the computing time. This makes it possible to adapt the device relatively fast to the respective requirements. Additionally, the installation of a costly delay module is saved, so that the hardware effort in this type of design of an ultrasonic imaging system is kept to a minimum. An additional advantage of this digital implementation is that the focusing depth can be changed easily, even during the scanning process. Thus it is possible to also produce images of curved surfaces.

There has thus been shown and described a novel ultrasonic imaging system which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. In an ultrasonic imaging system with a linear array having several transducer elements of which a respective group of commonly controlled transducer elements forms a beam aperture and to which one transmitting system and one receiving system are allocated and which are equipped with an electronic focusing of the sound field by phase delay and with parallel scan of the sound field by electronic advancement, the improvement wherein:
    (a) said transmitting system comprises for said transducer elements of said beam aperture respectively, one digitally programmable delay line, one buffer and one transmitting amplifier;
    (b) said receiving system comprises one analog-digital converter, a buffer memory and a computer;
    (c) said transducer elements of said linear array are each connected to said transmitting system via a transmit switch and each of said elements is connected via a receiver switch to said receiving system; and
    (d) said imaging system comprises a stepping motor which is movable perpendicularly to the electronic scan direction and perpendicularly to the sound field.

2. Ultrasonic imaging system in accordance with claim 1, wherein said receiving comprises n 8-bit analog-digital converters, n buffer memories and n broadband amplifiers.

3. Ultrasonic imaging system in accordance with claim 1, further comprising a data bus for connecting said computer to said respective buffer.

4. Ultrasonic imaging system in accordance with claim 1, wherein said computer is connected to said respective programmable delay lines by means of a transmitting trigger line.

5. Ultrasonic imaging system in accordance with claim 1, further comprising a broadband amplifier which is connected to said analog-digital converter in series.

6. Ultrasonic imaging system in accordance with claim 1, wherein said buffer memory is capable of operating with a pulse rate of at least 200 MHz.

7. Ultrasonic imaging system in accordance with claim 2, wherein said buffer memory is connected to said 8-bit analog-digital converter and to said computer via a respective data bus.

* * * * *